(12) United States Patent
Kallhoff et al.

(10) Patent No.: US 11,739,987 B2
(45) Date of Patent: Aug. 29, 2023

(54) DUAL INTEGRATED AIR HEATING SYSTEM

(71) Applicant: JR KOOP, INC., Sioux Falls, SD (US)

(72) Inventors: Curtis A. Kallhoff, Sioux Falls, SD (US); Nathan G. Thompson, Harrisburg, SD (US); Wesley W. Stofferan, Sioux Falls, SD (US)

(73) Assignee: JR Koop, Inc., Sioux Falls, SD (US)

( * ) Notice: Subject to any disclaimer, the term of this patent is extended or adjusted under 35 U.S.C. 154(b) by 564 days.

(21) Appl. No.: 16/890,498

(22) Filed: Jun. 2, 2020

(65) Prior Publication Data

US 2021/0372670 A1 Dec. 2, 2021

(51) Int. Cl.
*F24V 40/00* (2018.01)
*B60H 1/16* (2006.01)

(52) U.S. Cl.
CPC ............. *F24V 40/00* (2018.05); *B60H 1/16* (2013.01)

(58) Field of Classification Search
None
See application file for complete search history.

(56) References Cited

U.S. PATENT DOCUMENTS

| | | | |
|---|---|---|---|
| 4,272,967 A * | 6/1981 | White | F24F 1/04 62/239 |
| 4,632,019 A * | 12/1986 | Whiteman | B64F 1/364 454/119 |
| 4,901,538 A * | 2/1990 | Anthony | F25D 15/00 62/263 |
| 5,031,690 A * | 7/1991 | Anderson | F25B 6/02 62/239 |
| 5,383,335 A * | 1/1995 | Anderson | F24F 1/022 62/298 |
| 5,819,724 A | 10/1998 | Hybertson | |
| 6,186,138 B1 | 2/2001 | Hybertson | |
| 9,511,870 B2 * | 12/2016 | Dabaga | B64D 13/08 |

(Continued)

FOREIGN PATENT DOCUMENTS

CN 205931200 U * 2/2017

OTHER PUBLICATIONS

Google Patents, Machine translation of CN205931200U, https://patents.google.com/patent/CN205931200U/en?, retrieved Nov. 19, 2022 (Year: 2022).*

*Primary Examiner* — Avinash A Savani
*Assistant Examiner* — Deepak A Deean
(74) *Attorney, Agent, or Firm* — Jeffrey A. Proehl; Woods, Fuller, Shultz & Smith, PC

(57) ABSTRACT

An air heating apparatus may be mounted on a common base and define a pair of air flow paths. The air heating apparatus may include a housing forming an outer envelope through which the air flow paths extend, with the air flow path being separate from each other at all locations in the interior of the outer envelope. The interior of the housing may be divided into two subhousings defining two separate subchambers. The housing may have inlet and outlet openings extending through the outer envelope for each of the air flow paths of the subchambers. At least two air heating assemblies may each be configured to heat air moving along a separate one of the air flow paths, the air heating assemblies being positioned in the interior of the housing with each of the air heating assemblies being positioned in a respective one of the subchambers of the subhousings.

16 Claims, 7 Drawing Sheets

(56) References Cited

U.S. PATENT DOCUMENTS

| | | | |
|---|---|---|---|
| 2009/0107159 A1* | 4/2009 | Mann, III | B64F 1/364 62/239 |
| 2009/0108549 A1* | 4/2009 | Montminy | B64F 1/364 280/47.34 |
| 2010/0031676 A1* | 2/2010 | Urbain | F25D 21/04 62/204 |
| 2010/0072757 A1* | 3/2010 | Kealy | F02B 37/001 290/1 A |
| 2010/0307178 A1* | 12/2010 | Hansen | B64F 1/364 62/132 |
| 2011/0185713 A1* | 8/2011 | Koopmann | F24H 3/06 165/104.19 |
| 2015/0259073 A1* | 9/2015 | Dabaga | B64D 13/08 62/426 |
| 2016/0023770 A1* | 1/2016 | Thompson | B64F 1/364 237/28 |

\* cited by examiner

FIG. 1

DUAL INTEGRATED AIR HEATING SYSTEM

BACKGROUND

Field

The present disclosure relates to heating apparatus and more particularly pertains to a new dual integrated air heating system utilizing higher power air heating apparatus in a configuration which minimizes complication and cost of operation of the system.

SUMMARY

In one aspect, the present disclosure relates to a system for providing heated air which may comprise a common base and an air heating apparatus mounted on the common base. The air heating apparatus may define a pair of air flow paths, and may include a housing mounted on the base. The housing may form an outer envelope defining an interior, with the air flow paths being separate from each other at all locations in the interior of the outer envelope of the housing. The interior may be divided into two subhousings defining two separate subchambers, and the housing may have an inlet opening extending through the outer envelope for each of the subchambers and an outlet opening extending through the outer envelope for each of the subchambers. Each of the subchambers may have a respective one of the air flow paths extending between the inlet opening and the outlet opening of the respective subchamber. The air heating apparatus may also include at least two air heating assemblies each configured to heat air moving along a separate one of the air flow paths, and the air heating assemblies may be positioned in the interior of the housing with each of the air heating assemblies being positioned in a respective one of the subchambers of the subhousings.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 1 is a schematic perspective view of a new dual integrated air heating system according to the present disclosure.

DETAILED DESCRIPTION

Figure 1:
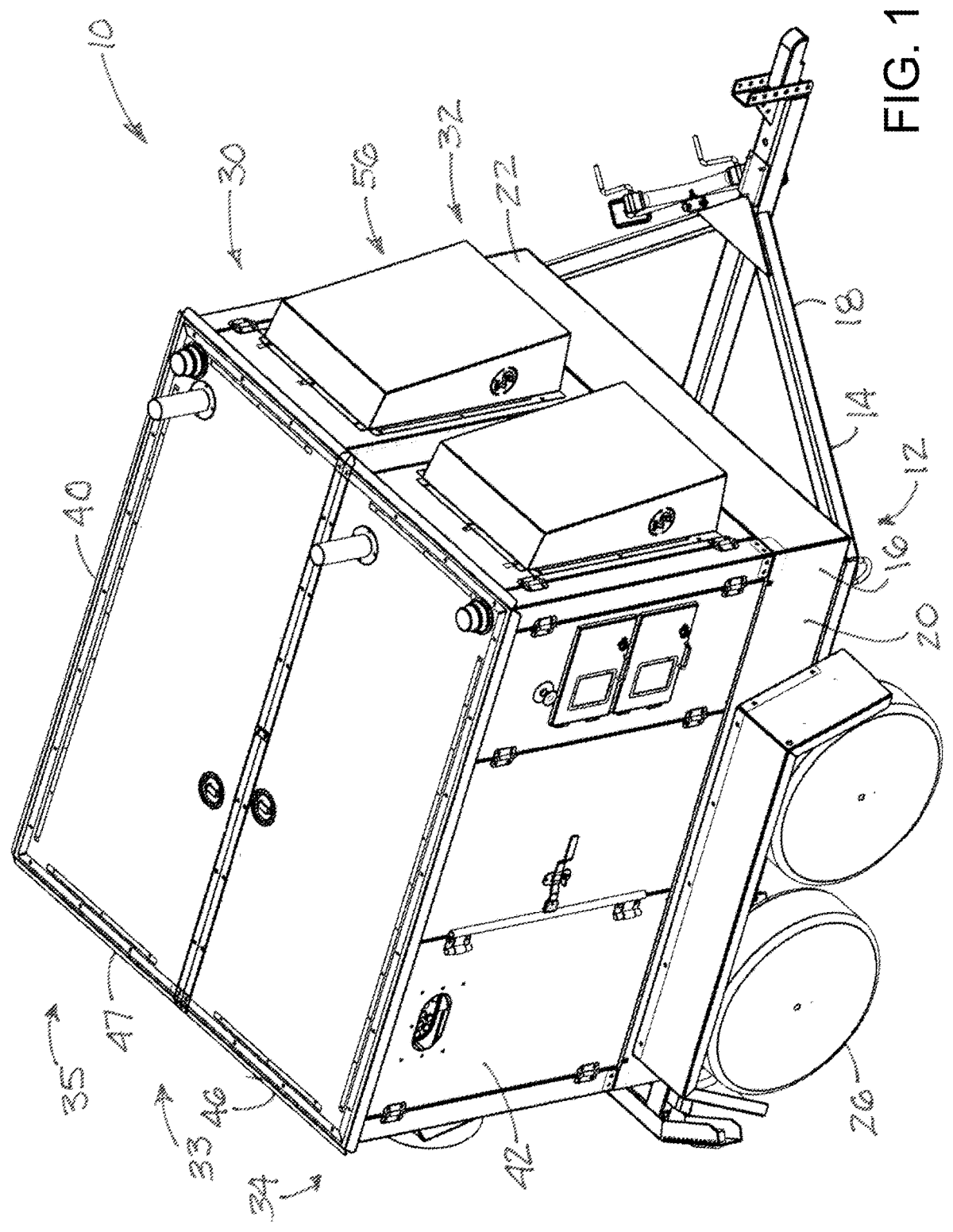
Figure 2:
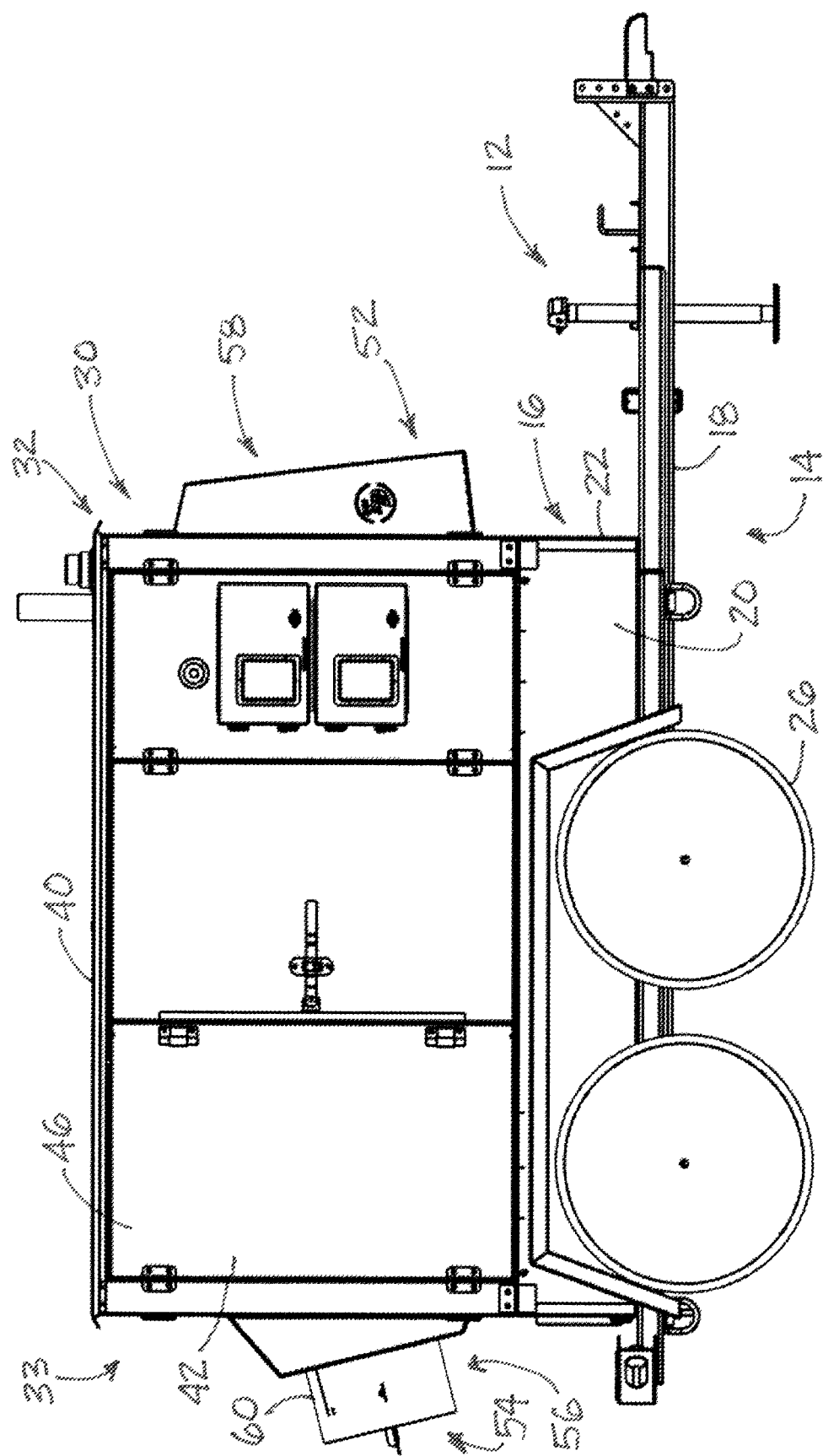
FIG. 2 is a schematic side view of the dual integrated air heating system, according to an illustrative embodiment.
Figure 3:
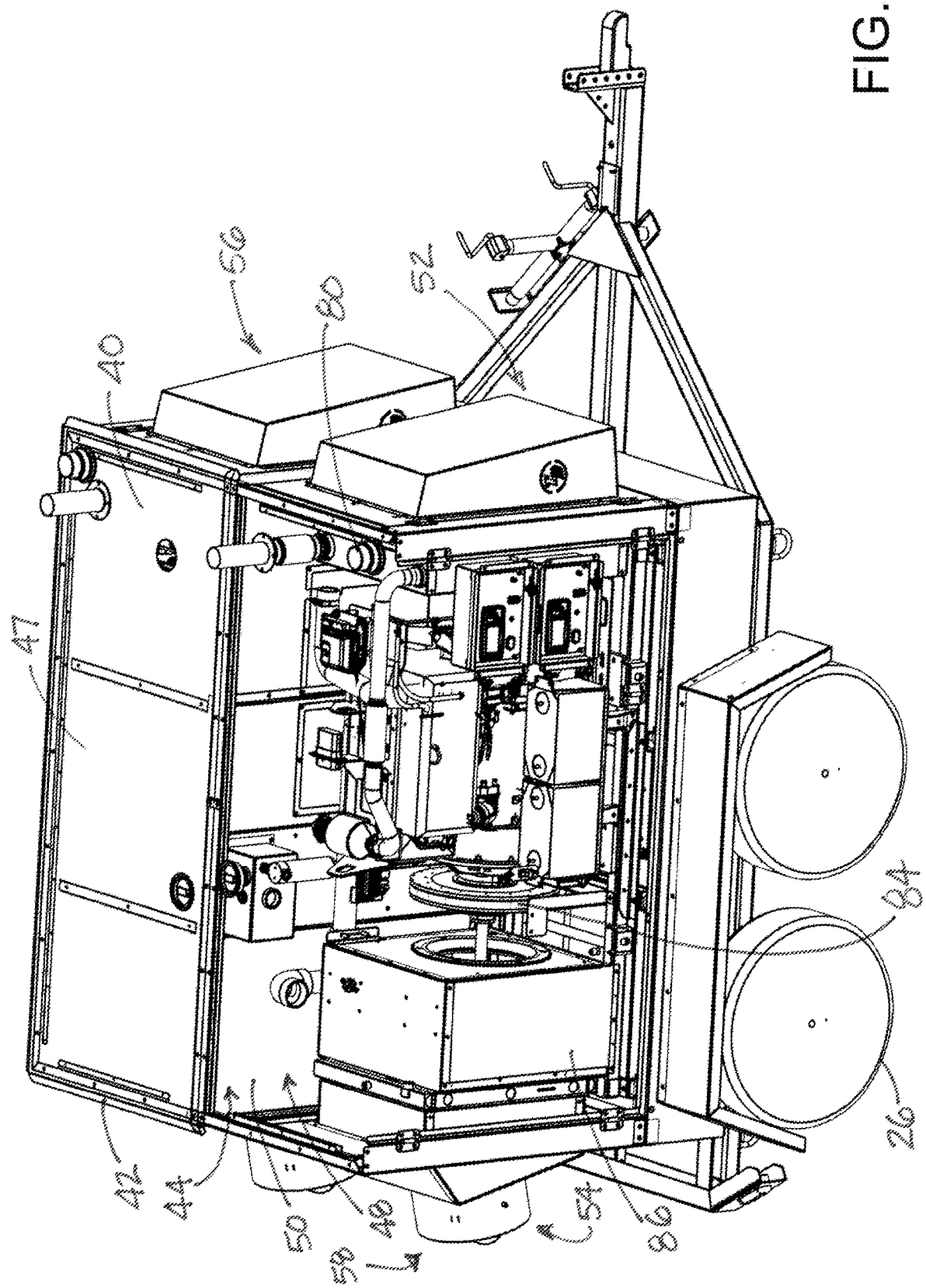
FIG. 3 is a schematic perspective view of the system, according to an illustrative embodiment, with a portion of the housing removed to reveal detail of the air heating apparatus.
Figure 4:
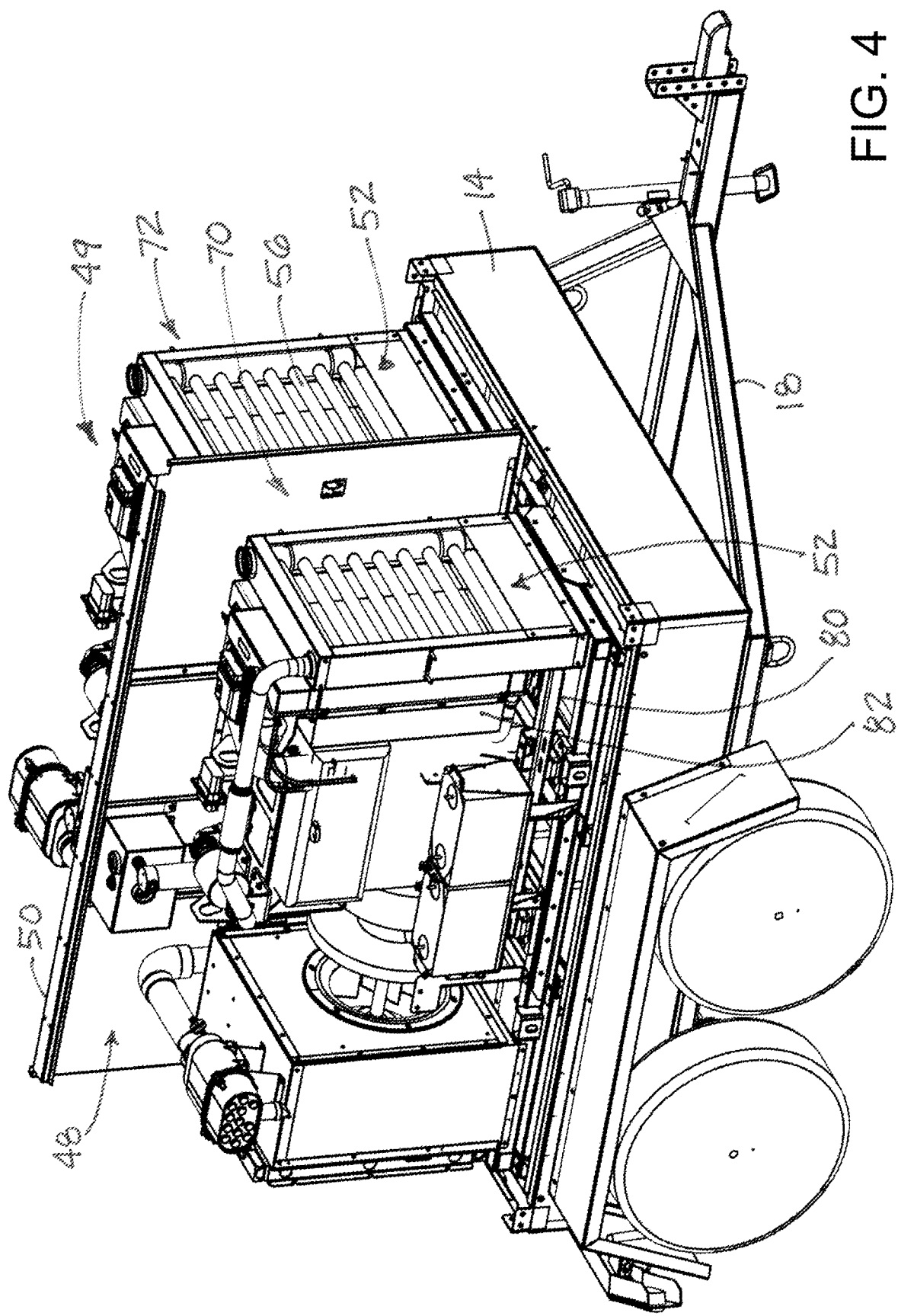
FIG. 4 is a schematic perspective view of the system, according to an illustrative embodiment, with a further portion of the housing removed to reveal detail of the air heating apparatus.
Figure 5:
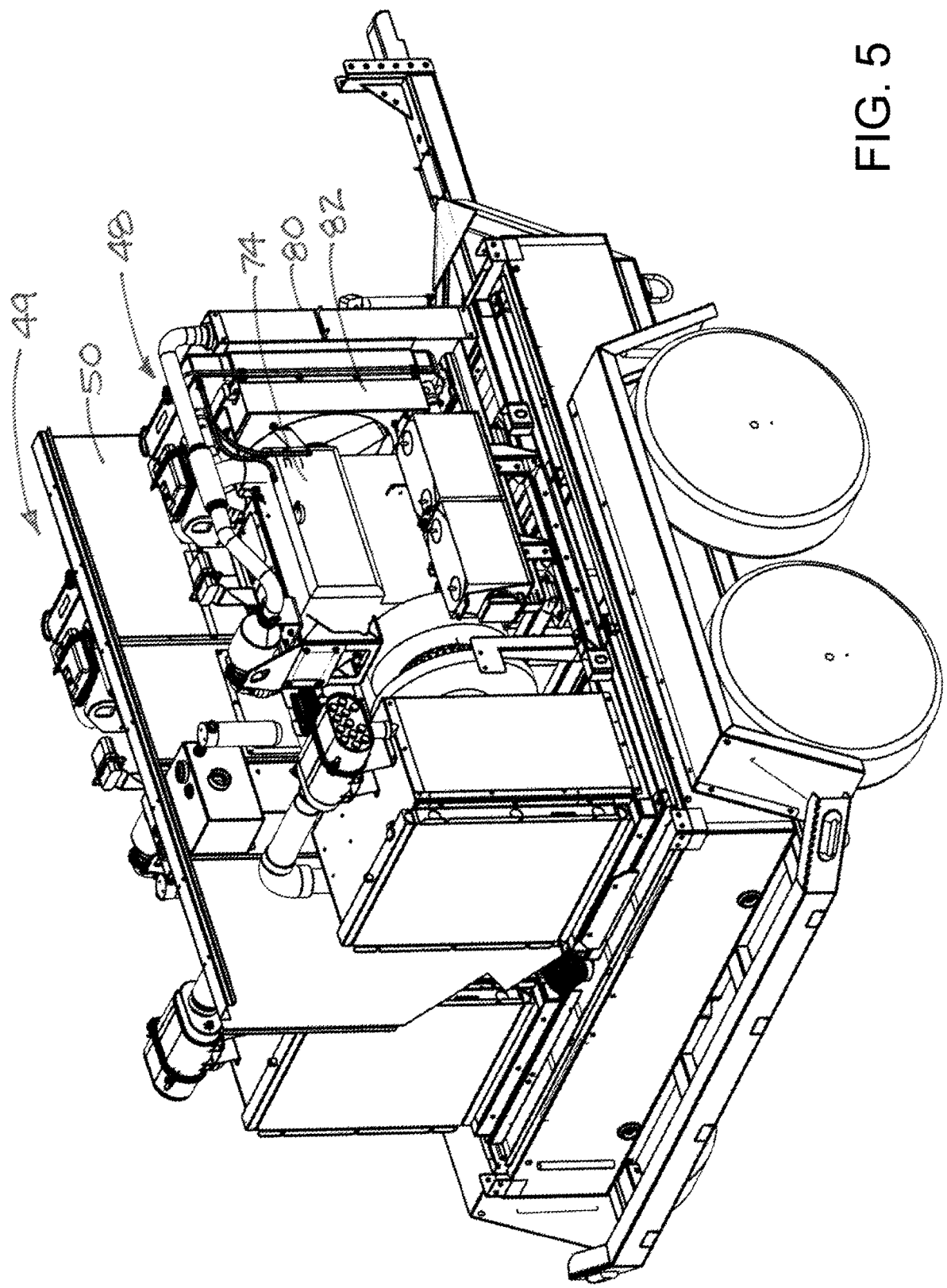
FIG. 5 is a schematic perspective view of the system as configured in FIG. 4, according to an illustrative embodiment, but shown from a different perspective.
Figure 6:
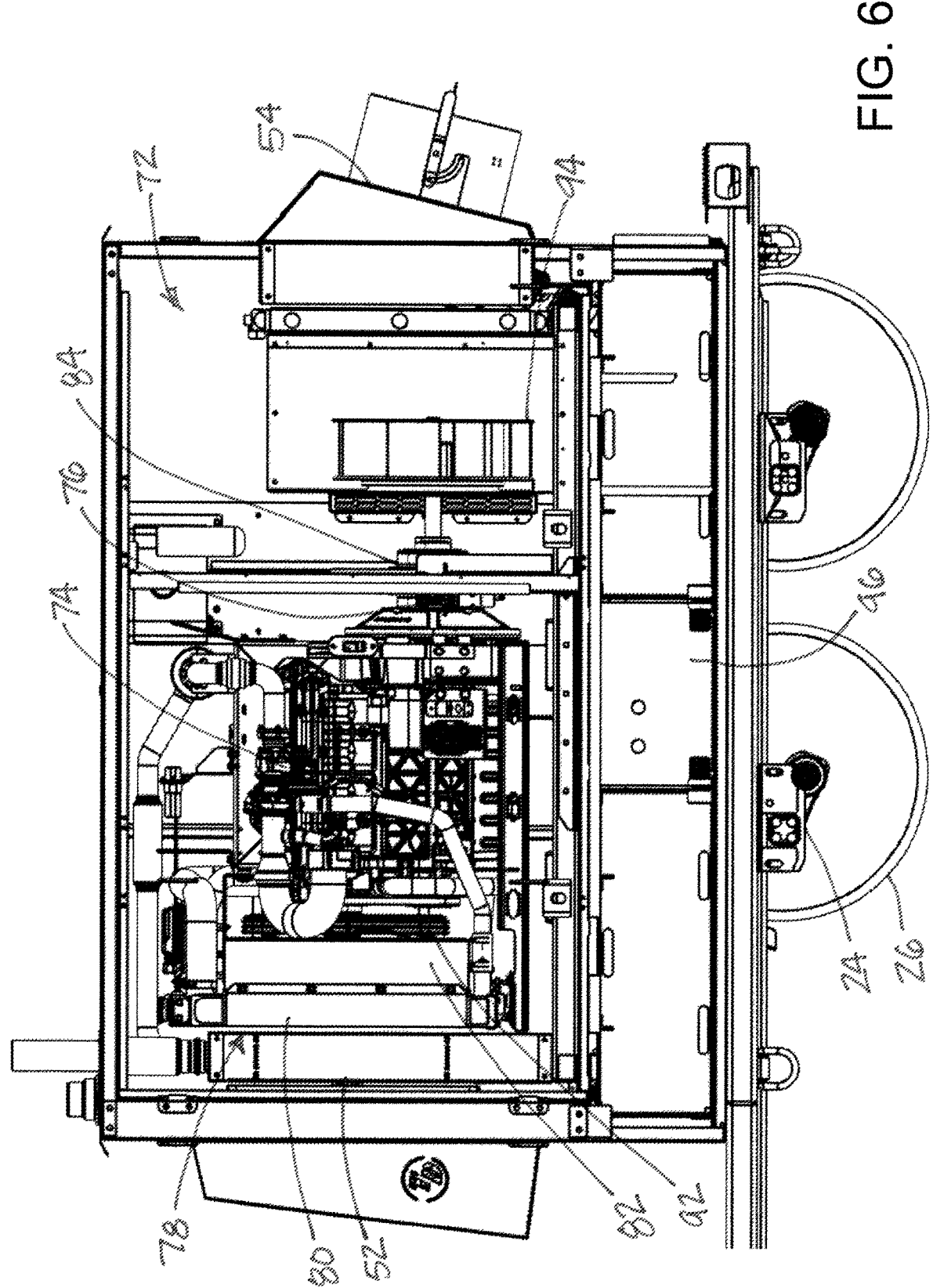
FIG. 6 is a schematic side view of the system, according to an illustrative embodiment, with a portion of the housing removed to reveal detail of the air heating apparatus.
Figure 7:
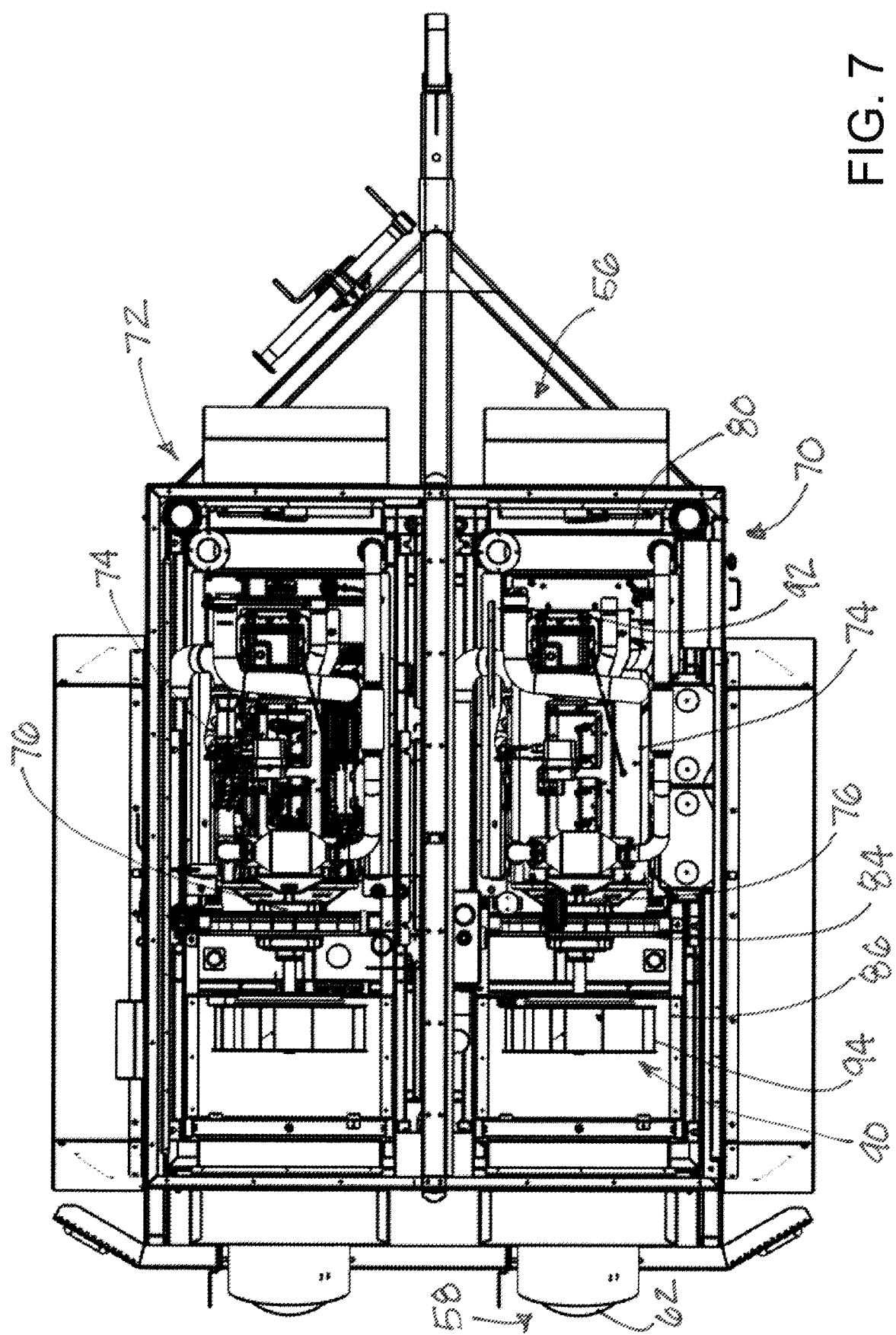
FIG. 7 is a schematic top view of the system, according to an illustrative embodiment, with portions of the housing removed to reveal detail of the air heating apparatus.

With reference now to the drawings, and in particular to FIGS. 1 through 7 thereof, a new dual integrated air heating system embodying the principles and concepts of the disclosed subject matter will be described.

The applicants have recognized that combustion engines provide a very useful power source for air heating apparatus, particularly those that are designed to be utilized away from sources of electrical power such as electrical power. Diesel combustion engines are particularly desirable for their fuel consumption efficiency which permits the use of relatively smaller fuel tanks to hold a smaller quantity of fuel without unduly limiting the operation time of the engine, and thus the air heating apparatus.

The applicants have also recognized that some of these benefits do not extend to relatively higher power, or higher horsepower, diesel engines because diesel engines with horsepower ratings above a threshold level regulated by the U.S. Environmental Protection Agency (EPA) require certain additional features to control pollutants emanated by the diesel engine. For example, diesel engines with a power rating above a threshold level require the injection of "diesel exhaust fluid" (DEF) into the exhaust gases of the diesel combustion engine to reduce the presence of certain nitrogen compounds in the exhaust gases. The DEF is a fluid that must be contained in a tank separate of the fuel utilized by the diesel engine to power the air heating apparatus, and the DEF tank and fluid add size and bulk as well as weight to the package of the air heating apparatus not to mention the extra cost of the DEF injection mechanism and the cost of the DEF (fluid). The DEF in the DEF tank must also be periodically replenished, requiring the operator of the air heating apparatus to obtain or carry along additional DEF for when the DEF is depleted from the tank.

Current EPA regulations make injection of DEF mandatory for diesel engines having a horsepower rating above a threshold level, which is currently 75 horsepower (hp) (approximately 56 kW), while effectively making it permissible for manufacturers to omit DEF injection systems from engines below the threshold level (e.g., 75 hp).

The applicants have realized that for air heating apparatus of larger capacity, it would be advantageous to avoid the need for the DEF injection system by utilizing two diesel combustion engines each having a power rating below the threshold level set by the EPA, rather than utilizing a single diesel combustion engine with a power rating above the threshold level.

In one aspect, the disclosure relates to a system 10 for heating air or other gases which is configured to avoid the regulatory need to include a DEF injection system.

The system 10 of the disclosure may include a common base 12 configured to support other elements of the system. In some embodiments, the common base 12 may form a mobile base which is readily movable over the ground surface such as by, for example, towing of the mobile base across the ground surface and over streets and highways. Illustratively, the base 12 may include a base frame 14 which may have a main portion 16 and, in the case of a mobile base, the frame 14 may also include a tongue portion 18 adapted for attaching or hitching to a towing vehicle. The main portion 16 of the frame 14 may form a substantially rectangular perimeter, with a pair of side members 20 extending rearwardly from the main portion 16, and a pair of cross members 22 extending between the side members 20. In a mobile form, the base 12 may also include at least one axle 24 which is mounted on the base frame 14, such as on the side members 20, and may include a pair of axles positioned forwardly and rearwardly with respect to each other on the mainframe. The mobile base 12 may also include a pair of wheels 26 mounted on opposite ends of the axle 24.

The system 10 may also include an air heating apparatus 30 which is mounted on the common base 12. For purposes of this description, the air heating apparatus 30 may be described as having a front 32, a rear 33, a left lateral side 34, and a right lateral side 35. In some embodiments, the horizontal extent of the air heating apparatus 30 may extend to the rectangular perimeter of the main portion 16 of the frame. The apparatus 30 may generally have a top and a bottom with the bottom being positioned on the base frame 14 and being suitably secured to the frame 14.

In general, the air heating apparatus 30 may define a pair of air flow paths 36, 38 through the apparatus 30. The apparatus 30 may include a housing 40 which is mounted on the base 12, and more specifically on the base frame 14. The housing 40 may comprise the single and sole housing of the air heating apparatus. The housing 40 may form an outer perimeter 42, and may form an outer extent or envelope for the air heating apparatus 30. In some embodiments, the outer perimeter 42 may generally correspond to the substantially rectangular perimeter of the main portion 16 of the base frame, although other configurations may be suitable.

The housing 40 may define an interior 44 enclosed by the outer envelope of the housing. The housing 40 may be configured to form two sub portions of the housing 40, or subhousings 46, 47, which effectively divide the interior 44 into separate subdivisions or subchambers 48, 49. Illustratively, the subhousings 46, 47 may include a left subhousing 46 which defines the left subchamber 46, and a right subhousing 47 which defines a right sub chamber 49. In some embodiments, the volume of the subchambers 46, 47 may be approximately equal in size to each other. The housing 40 may also include a divider wall 50 which is shared between the subhousings 46, 47 and divides the interior 44 into the respective subchambers 48, 49. The divider wall 50 may extend between the left and right subchambers and may extend from the front 32 to the rear 33 of the heating apparatus 30. The presence of the divider wall may serve to isolate the subchambers of the subhousings from each other such that no air or other gas is communicated between the subchambers.

The housing 40 may have an inlet opening 52 extending through the outer envelope for each of the subhousings 46, 47, and the respective subchambers 48, 49. The housing 40 may also have an outlet opening 54 extending through the outer envelope for each of the subhousings and respective subchambers. Each of the subchambers 48, 49 may have a respective air flow path 36, 38 extending between the inlet and outlet openings of the respective subhousing and subchamber. The air flow paths 36, 38 may be configured to maintain separate air flows through the apparatus 30, and the air flow paths may not intersect such that the air flows do not intermingle with each other. The air flow paths may thus be separate from each other at all locations in the interior 44 of the outer envelope between the inlet and outlet openings of the respective sub chambers of the housing.

In some embodiments, the housing 40 may include a flow control louver assembly 56 which is associated with the inlet opening 52 of each of the air flow paths to control airflow through the inlet opening and into the associated air flow path. A separately controllable louver assembly 56 may be provided for each of the inlet openings of the respective air flow paths 36, 38. Illustratively, the flow control louver assembly 56 may be located toward or at the front 32 of the air heating apparatus 30, although other locations may be utilized.

Embodiments of the housing 40 may also include a flow control valve assembly 58 which is associated with the outlet opening for each of the air flow paths to control airflow through the outlet opening and out of the associated air flow path. The flow control valve assemblies 58 may also be individually controllable such that one valve assembly may be adjusted differently than the other valve assembly. Illustratively, the flow control valve assembly 58 may be located at the rear 33 of the heating apparatus 30, and may include a duct 60 and a butterfly-type valve 62 which is positioned in the duct.

Significantly, the air heating apparatus 30 includes at least two air heating assemblies 70, 72 which are each configured to heat air moving along one of the air flow paths extending between the respective inlet and outlet openings of the left and right subchambers. Both or all of the air heating assemblies may be positioned in the interior 44 of the housing, and each of the air heating assemblies may be positioned in a separate one of the subchambers of the subhousings. The air heating assemblies 70, 72 thus may be isolated from each other in a separate subchamber formed by one of the subhousings.

Each of the air heating assemblies 70, 72 may include an engine 74 which operates to rotate a respective driveshaft 76. The engine of each of the air heating assemblies is positioned in the interior 44 of the housing 40, with each of the engines being positioned in the subchamber of the respective subhousing.

Each air heating assembly may also include an engine exhaust heat recovery apparatus 78 which is configured to transfer exhaust heat of the engine 74 to the air flowing along the air flow path of the respective subhousing. The heat recovery apparatus 78 may include an exhaust heat exchanger 80 which is in fluid communication with the exhaust or combustion gases produced by the respective engine. The exhaust heat exchanger 80 may be positioned downstream of the flow control louver 56 in the air flow path, and exhaust gases from the engine may pass through the heat exchanger 80 after exiting the engine. The exhaust gases remain isolated from the air flow path and may be exhausted from the interior 44 of the housing in any suitable manner, such as an exhaust pipe extending through the top of the housing.

Each air heating assembly may also include an engine waste heat recovery assembly 82 which is configured to transfer waste heat of the engine to the air flow moving along the respective air flow path. The engine waste heat recovery assembly 82 may be positioned in the air flow path to transfer waste engine heat to the air in the air flow path. The heat recovery assembly 82 may comprise a radiator through which engine coolant liquid flowing from the engine passes, and may be configured such that coolant heated by the engine passes through the radiator to heat the radiator, and also to the air passing through the radiator as the air moves along the air flow path. In some embodiments, the radiator of the heat recovery assembly 82 may be positioned downstream of the exhaust heat exchanger 80.

Each air heating assembly may also include a heat generator 84 which generates heat in a fluid from rotation energy. An example of a highly suitable heat generator is disclosed in U.S. Pat. No. 5,819,724 of Hybertson, which is hereby incorporated by reference in its entirety. The heat generator 84 may be operatively connected to the engine 74 such that the engine transfers rotational energy to the heat generator 84 and the heat generator generates heat in a viscous fluid, such as an oil. A main heat exchanger 86 may be configured to transfer heat generated by the heat generator 84 to air flowing along the respective air flow path. The main heat exchanger 86 may be in fluid communication with the heat generator 84 to receive the heated fluid from the generator. The main heat exchanger 86 may be positioned downstream of the exhaust heat exchanger in the air flow path extending between the inlet and outlet openings associated with the air path. The main heat exchanger 86 may also be positioned downstream of the engine waste heat recovery assembly. The main heat exchanger 86 may be located furthest downstream in the air flow path of the air heating assembly, and may be positioned adjacent to the outlet opening of the housing.

Each air heating assembly may also include an air movement assembly 90 which is configured to move air along the air flow path associated with the air heating assembly.

The air movement assembly 90 may comprise a primary fan 94 which is positioned in the air flow path to move air along the air flow path. The primary fan 94 may be located adjacent to the heat generator, and may be on a common rotating driveshaft of the engine with the heat generator 84. Illustratively, the primary fan may comprise a centrifugal flow fan, although other types of fans may be utilized. The air movement assembly 90 may also include a secondary fan 92 which is positioned in the air flow path to move air along the air flow path. The secondary fan 94 may be positioned upstream from the primary fan 94, and may be operatively connected to the engine to be rotated by the engine. In some embodiments, the secondary fan 92 may be positioned adjacent to the radiator of the heat recovery assembly 82 and may comprise an axial flow fan.

The air heating apparatus 30 may also include a fuel tank 96 which provides fuel for at least one, and in some embodiments both, of the air heating apparatus of the system 10. The fuel tank 96 may be mounted on the common base 12, and may be mounted on the base frame 14. Illustratively, the fuel tank may be positioned within the perimeter of the main frame.

Significantly, each of the engines 74 may have a horsepower rating corresponding to the power provided by the engine during operation. In the most preferred embodiments of the disclosure, the horsepower rating of the engine is less than approximately 75 hp (approximately 56 kW), and may be less than 74.9 hp (approximately 55.9 kW), and may be between approximately 25.5 hp (approximately 19 kW) and approximately 75 hp. In some of the most preferred embodiments, the engine has a horsepower rating of approximately 74.5 horsepower (approximately 55.6 kW). In some embodiments, the engines of the air heating assemblies have substantially similar horsepower ratings, and both engines have horsepower ratings lower than approximately 75 hp. In some embodiments, the engines of the air heating assemblies have different horsepower ratings, but the engines have horsepower ratings lower than approximately 75 hp.

In operation, the air heating assemblies 70, 72 may be operated individually such that both assemblies 70, 72 may be operated simultaneously, or only one of the assemblies 70, 72 may be operated at a time.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:
1. A system comprising:
a common base;
an air heating apparatus mounted on the common base, the air heating apparatus defining a pair of air flow paths, the air heating apparatus comprising:

a housing mounted on the base, the housing forming an outer envelope defining an interior, the air flow paths being separate from each other at all locations in the interior of the outer envelope of the housing, the interior being divided into two subhousings defining two separate subchambers, the housing having an inlet opening extending through the outer envelope for each of the subchambers, the housing having an outlet opening extending through the outer envelope for each of the subchambers, each of the subchambers having a respective one of the air flow paths extending between the inlet opening and the outlet opening of the respective subchamber;

at least two air heating assemblies each configured to heat air moving along a separate one of the air flow paths, the air heating assemblies being positioned in the interior of the housing with each of the air heating assemblies being positioned in a respective one of the subchambers of the subhousings;

wherein the two subhousings define a first said subchamber with a first said air flow path and a second said subchamber with a second said air flow path, the first air flow path being separate from the second air flow path;

wherein the first subchamber has a first said inlet opening and a first said outlet opening for the first air flow path, the second subchamber having a second said subchamber having a second said inlet opening and a second said outlet opening for the second air flow path; and wherein the first inlet opening and the second inlet opening are separate of each other on the housing.

2. The system of claim 1 wherein each of the air heating assemblies comprises: an internal combustion engine positioned in one of the subchambers of the interior of the housing, the internal combustion engine rotating a drive shaft; a heat generator generating heat in a fluid from rotation energy, the heat generator being positioned in the same subchamber as the internal combustion engine, the heat generator being driven by the drive shaft of the internal combustion engine; and a main heat exchanger configured to transfer heat generated by the heat generator to air flowing along the air flow path of the subchamber, the main heat exchanger being in fluid communication with the heat generator; where in a said internal combustion engine, a said heat generator, and a said main heat exchanger of a said air heating assembly is positioned in each of the subchambers of the sub housings.

3. The system of claim 2 wherein the internal combustion engine of each of the air heating assemblies has a horsepower rating, the horsepower rating of each of the internal combustion engines being less than 75 horsepower.

4. The system of claim 3 wherein the horsepower rating of the internal combustion engine of at least one of the air heating assemblies is between approximately 25 horsepower and approximately 75 horsepower.

5. The system of claim 3 wherein the horsepower rating of the internal combustion engine of at least one of the air heating assemblies is 74.5 horsepower.

6. The system of claim 3 wherein the horsepower rating of the internal combustion engine of both of the air heating assemblies is 74.5 horsepower.

7. The system of claim 1 wherein the housing includes a divider wall dividing the interior into the subchambers of the sub housings.

8. The system of claim 1 wherein the housing includes a flow control louver assembly effective to control air flow into the inlet opening of the air flow path of a respective one of the subchambers such that the housing has a pair of the flow control louver assemblies with each flow control louver assembly controlling air flow along one of the air flow paths.

9. The system of claim 1 wherein the housing includes a flow control valve assembly effective to control air flow out of the outlet opening of the air flow path of a respective one of the subchambers such that the housing has a pair of the flow control valve assemblies with each flow control valve assembly controlling air flow along one of the air flow paths.

10. The system of claim 1 wherein the air heating apparatus further includes a common fuel tank configured to provide fuel to the internal combustion engines of all air heating assemblies of the air heating apparatus.

11. The system of claim 1 wherein the air flow paths of the heating apparatus do not intermingle with each other.

12. The system of claim 1 wherein the first outlet opening and the second outlet opening are separate of each other on the housing.

13. The system of claim 1 wherein the first and second inlet openings are positioned adjacent to each other on the housing.

14. The system of claim 12 wherein the first and second outlet openings are positioned adjacent to each other on the housing.

15. The system of claim 12 wherein the common base comprises a mobile base having: a base frame with a main portion and a tongue portion, at least one axle mounted on the base frame; and a pair of wheels mounted on the at least one axle.

16. A system comprising:
a mobile base having:
a base frame with a main portion and a tongue portion, at least one axle mounted on the base frame; and
a pair of wheels mounted on the at least one axle;
an air heating apparatus mounted on the mobile base, the air heating apparatus defining a pair of air flow paths, the air heating apparatus comprising:
a housing mounted on the base, the housing forming an outer envelope defining an interior, the air flow paths being separate from each other at all locations in the interior of the outer envelope of the housing, the interior being divided into two subhousings defining two separate subchambers including a first subchamber and a second subchamber, the housing having an inlet opening extending through the outer envelope for each of the subchambers and the housing having an outlet opening extending through the outer envelope for each of the subchambers such that the first subchamber is in communication with a first said inlet opening of the housing and a first said outlet opening of the housing and the second subchamber is in communication with a second said inlet opening of the housing and a second said outlet opening of the housing, each of the subchambers having a respective one of the air flow paths such that the first subchamber has a first air flow path extending between the first inlet opening and the first outlet opening and the second subchamber has a second air flow path extending between the second inlet opening and the second outlet opening, and wherein the first inlet opening and the second inlet opening are separate of each other on the housing;
a pair of air heating assemblies including a first air heating assembly and a second air heating assembly, each of the air heating assemblies being configured to heat air moving along a separate one of the air flow paths, the first air heating assembly being positioned in the interior of the subchamber of the first subhousing and the second air heating assembly being positioned in the interior of the subchamber of the second subhousing; and wherein each of the first and second air heating assemblies comprises:

an internal combustion engine positioned in one of the subchambers of the interior of the housing, the internal combustion engine rotating a drive shaft;

a heat generator generating heat in a fluid from rotation energy, the heat generator being positioned in the same subchamber as the internal combustion engine, the heat generator being driven by the drive shaft of the engine; and0 a main heat exchanger configured to transfer heat generated by the heat generator to air flowing along the air flow path of the subchamber, the main heat exchanger being in fluid communication with the heat generator;

wherein a said internal combustion engine, a said heat generator, and a said main heat exchanger of a said air heating assembly is positioned in each of the subchambers of the sub housings; and a common fuel tank configured to provide fuel to the internal combustion engines of all air heating assemblies of the air heating apparatus.

\* \* \* \* \*